United States Patent [19]

Asghar et al.

[11] Patent Number: 4,994,993
[45] Date of Patent: Feb. 19, 1991

[54] SYSTEM FOR DETECTING AND CORRECTING ERRORS GENERATED BY ARITHMETIC LOGIC UNITS

[75] Inventors: Safdar M. Asghar; John G. Bartkowiak; Eric A. Suss, all of Austin, Tex.

[73] Assignee: Advanced Micro Devices, Inc., Sunnyvale, Calif.

[21] Appl. No.: 262,658

[22] Filed: Oct. 25, 1988

[51] Int. Cl.$^5$ ............................................. G06F 11/00
[52] U.S. Cl. ....................................... 364/740; 371/30
[58] Field of Search ... 364/740, 737, 741, 200 MS File, 364/900 MS File; 371/30

[56] References Cited

U.S. PATENT DOCUMENTS

| | | | |
|---|---|---|---|
| 2,789,759 | 4/1957 | Tootill | 364/740 |
| 2,861,744 | 11/1958 | Schmitt | 364/740 |
| 2,998,191 | 8/1961 | Marshall | 364/737 |
| 3,037,698 | 6/1962 | Saxenmeyer | 364/740 |
| 3,660,646 | 5/1972 | Minero | 364/740 |
| 4,719,589 | 1/1988 | Tanaka | 364/737 X |

*Primary Examiner*—Jerry Smith
*Assistant Examiner*—Robert W. Beausoliel
*Attorney, Agent, or Firm*—Foley & Lardner

[57] ABSTRACT

Apparatus is provided for performing a method for detecting and correcting errors in one clock cycle that occur during arithmetic operations of at least two operands. Specifically, two operands are operated on to obtain a result. The digits of the result are added to one another. This adding step is repeated until a first single digit is achieved. The digits of each of the operands are added to one another to obtain an intermediate sum. The digits of the intermediate sum, in turn, are added to one another. Once again, this operation is repeated until a second single digit is achieved. The first single digit number is compared with the second single digit number and a signal indicative of error is generated if the comparison is unsuccessful.

In order to correct the error, the digits of each of the operands are added to one another to obtain an intermediate sum. Sequentially, a digit is subtracted from the partial sum of the remaining digits of each of the operands. The results of the subtraction for each operand are added to one another at the end of each sequential cycle to obtain a set of arguments, each of which is subtracted from the intermediate sum to obtain a set of partial differences. The partial differences are concatenated to obtain a transitional value. By eliminating certain digits, a correct value of the arithmetic operation is obtained.

13 Claims, 4 Drawing Sheets

SYSTEM FOR DETECTING AND CORRECTING ERRORS GENERATED BY ARITHMETIC LOGIC UNITS

BACKGROUND OF THE INVENTION

The present invention relates to an error detection and correction system and, more particularly, to a system for detecting and correcting calculation errors that occur in a computer processor or an arithmetic logic unit (ALU).

In the field of computer technology, much effort has been expended in attempting to improve and ensure integrity of data processing. Specifically, whenever data is transferred from one component of a computer system to another and whenever data is mathematically manipulated, there is a risk that resulting data will be inaccurate. In certain high performance computing systems, the risk is increased by the fact that a great number of data transfers or mathematical operations occur in a short period of time.

Almost since the inception of computer processors, error detection and correction mechanisms have been devised to help reduce the risk of inaccurate data transfer and manipulation. Heretofore, one of the conventional approaches to ensure data integrity has been to add a code to a data stream prior to transferring or arithmetically manipulating it. This approach has proven relatively successful, but only for certain types of operations.

One of the earliest methods for detecting errors during data transfers, for example, was the parity check code. A binary code word has odd parity if an odd number of its digits are 1's. For example, the number 1011 has three 1 digits and therefore has odd parity. Similarly, the binary code word 1100 has an even number of 1 digits and therefore has even parity.

A single parity check code is characterized by an additional check bit added to each data word to generate either odd or even parity. An error in a single digit or bit in a data word would be discernible since the parity check bit associated with that data word would then be reversed from what is expected. Typically, a parity generator adds the parity check bit to each word before transmission. This technique is called padding the data word. At the receiver, the digits in the word are tested and if the parity is incorrect, one of the bits in the data word is considered to be in error. When an error is detected at a receiver, a request for a repeat transmission can be given so that the error can be corrected. Only errors in an odd number of digits can be detected with a single parity check, since an even number of errors results in the parity expected for a correct transmission. Moreover, the specific bit in error cannot be identified by the parity check procedure as hereinabove described.

A more sophisticated error detection system was later devised. Data words of a fixed length of bits were grouped into blocks of a fixed number of data words each. Parity checks were then performed between different data words as well as for each individual data word. The block parity code detected many patterns of errors and could be used not only for error detection, but also for error correction when an isolated error occurred in a given row and column of the matrix. While these geometric codes were an improvement over parity check bits per se, they still could not be used to detect errors that were even in number and symmetrical in two dimensions.

After parity check codes and geometric codes were devised, a code was invented by Hamming, after whom it is named. The Hamming code is a system of multiple parity checks that encodes data words in a logical manner so that single errors can be not only detected but also identified for correction. A transmitted data word used in the Hamming code consists of the original data word and parity check digits appended thereto. Each of the required parity checks is performed upon specific bit positions of the transmitted word. The system enables the isolation of an erroneous digit, whether it is in one of the original data word bits or in one of the added parity check bits.

If all the parity check operations are performed successfully, the data word is assumed to be error free. If one or more of the check operations is unsuccessful, however, the single bit in error is uniquely determined by decoding so-called syndrome bits, which are derived from the parity check bits. Once again, only single bit errors are detected and corrected by use of the conventional Hamming code. Double bit errors, although detectable by the Hamming code, are not correctable.

The Hamming code is only one of a number of codes, generically called error correcting codes (ECC's). Codes are usually described in mathematics as closed sets of values that comprise all the allowed number sequences in the code. In data communications, transmitted numbers are essentially random data patterns which are not related to any predetermined code set. The sequence of data, then, is forced into compliance with the code set by adding to it at the transmitter, as hereinabove mentioned. A scheme has heretofore been developed to determine what precise extra string to append to the original data stream to make the concatenation of transmitted data a valid code. There is a consistent way of extracting the original data from the code value at the receiver and to deliver the actual data to the location where it is ultimately used. For the code scheme to be effective, it must contain allowed values sufficiently different from one another so that expected errors do not alter an allowed value such that it becomes a different allowed value of the code.

A cyclic redundancy code (CRC) consists of strings of binary data evenly divisible by a generator polynomial, which is a selected number that results in a code set of values different enough from one another to achieve a low probability of an undetected error. To determine what to append to the string of original data, the original string is divided as it is being transmitted. When the last data bit is passed, the remainder from the division is the required string that is added since the string including the remainder is evenly divisible by the generator polynomial. Because the generator polynomial is of a known length, the remainder added to the original string is also of fixed length.

At the receiver, the incoming string is divided by the generator polynomial. If the incoming string does not divide evenly, an error is assumed to have occurred. If the incoming string is divided by the generator polynomial evenly, the data delivered to the ultimate destination is the incoming data with the fixed length remainder field removed.

It has been found, however, that appending or concatenating a code to data to be transferred or arithmetically manipulated is burdensome, requiring additional and often expensive logic to accomplish. Moreover, the time required to generate the code on the transferring end and to decode and verify the code on the receiving end is, in certain cases, unacceptable. In the case of data manipulation and verification of proper ALU operation especially, additional codes result in inefficient performance.

Moreover, the aforementioned error detection and/or correction systems have been used most generally in transmitting and receiving data, rather than in acting on data mathematically. Thus, the communications channels were tested, but the computing engines were not. Techniques for correcting errors in arithmetic operations have conventionally been relegated merely to reperforming the same operations on the same processor or on other processors.

Finally, due to an inevitable comparison step in the detection cycle of the processes of the prior art, correction of errors could occur only some appreciable time thereafter—an untenable situation for high speed processing units.

It would be advantageous to provide a system for detecting errors in arithmetic operations without the need of composing and decoding a code appended to a data stream.

It would also be advantageous to provide a system for detecting and correcting errors in arithmetic operations by using a minimum amount of logic.

It would also be advantageous to provide a system for detecting and correcting errors in arithmetic operations in a short period of time (e.g., one or two clock cycles).

It would further be advantageous to provide a system for detecting and correcting errors in arithmetic operations that would provide a signal indicating that an error occurred therein, while the results of such arithmetic operations could nevertheless be corrected automatically.

It would also be advantageous to provide a system for preempting incorrect results of an arithmetic operation with correct results therefor.

It would also be advantageous to provide a system for detecting and correcting errors in arithmetic operations in which two arithmetic logic units could calculate the arithmetic operation independently and by different techniques, thus arriving at verifiable accurate results.

SUMMARY OF THE INVENTION

In accordance with the present invention, there is provided apparatus for performing a method of detecting and correcting errors in one clock cycle that occur during arithmetic operations of at least two operands.

Specifically, two operands are operated on to obtain a result. The digits of the result are added to one another. This adding step is repeated until a first single digit is achieved. The digits of each of the operands are added to one another to obtain an intermediate sum. The digits of the intermediate sum, in turn, are added to one another. Once again, this operation is repeated until a second single digit is achieved. The first single digit number is compared with the second single digit number and a signal indicative of error is generated if the comparison is unsuccessful.

In order to correct the error, the digits of each of the operands are added to one another to obtain an intermediate sum. Sequentially a digit is subtracted from the partial sum of the remaining digits of each of the operands. The results of the subtraction for each operand are added to one another at the end of each sequential cycle to obtain a set of arguments, each of which is subtracted from the intermediate sum to obtain a set of partial differences. The partial differences are concatenated to obtain a transitional value. By eliminating certain digits, a correct value of the arithmetic operation is obtained.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
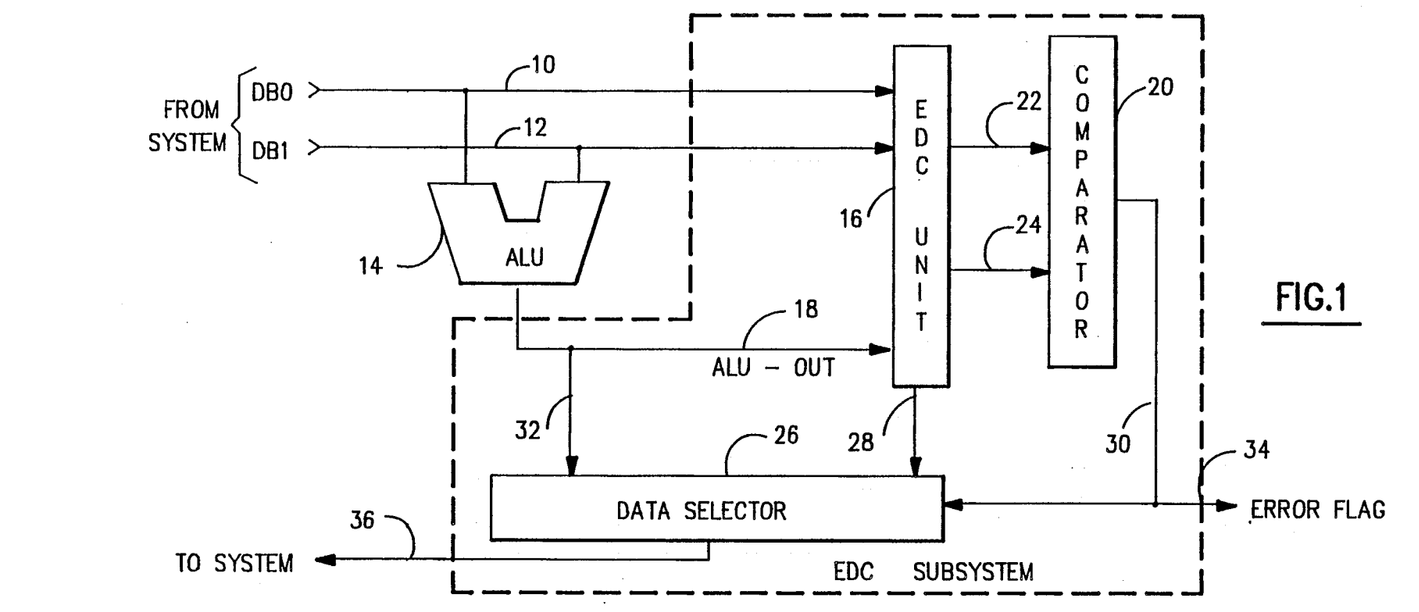
FIG. 1 is a block diagram of a self-checking unit in accordance with the preferred embodiment of the present invention.

Referring now to FIG. 1, there is shown a block diagram of a self-checking unit in accordance with the preferred embodiment of the present invention. A data line 10 transmits a DB0 data signal representative of a first operand and another data line 12 transfers a DB1 data signal from a second operand. The 16-bit signals transmitted over lines 10 and 12 are applied to an arithmetic logic unit (ALU) 14, the operation of which is described in further detail hereinbelow. The ALU 14 can be any general purpose 16-bit processor, such as a Model No. 29116 microprocessor manufactured by Advanced Micro Devices, Inc. The data signals over lines 10 and 12 are also applied to an error detection and correction (EDC) unit 16.

The output of ALU 14 is also applied over a 16-bit line to EDC unit 16, but is delayed for a period of time due to the performance of arithmetic calculations within the ALU 14. The EDC unit 16 is electrically connected to a comparator 20 over a pair of 4-bit data lines 22 and 24. The comparator 20 may be any 4-bit comparator, such as Model No. SN54585 manufactured by Texas Instruments, Inc.

The output from comparator 20 is applied to a 16-bit data selector 26. The comparator 20 generates a one bit status signal over line 30. Also applied to the data selector 26 is an output signal from ALU 14 over line 32.

Thus, the error detection and correction subsystem, shown in phantom in FIG. 1, comprises three components: the EDC unit 16, the comparator 20 and the data selector 26.

As mentioned, the comparator 20 generates a status signal over line 30. The status line 30 is applied not only to the data selector 26, as previously mentioned, but also to an error flag, not shown, over line 34. The error flag status is input to a status register, not shown, for further processing.

The output of data selector 26 is a 16-bit signal over line 36 sent to a microprocessor system, not shown.

At this point it would be most helpful to understand the theoretical principles on which the present invention is based.

Consider two 2-digit numbers or operands to be added:

| 49 and 68 | |
|---|---|
| By vertical (standard) addition: | 49 |
| | +68 |
| The result is | 117 |

Let operand 49 be represented by the variable X.

$X=(x_1,x_2)$ where $x_1=4$ and $x_2=9$, the individual digits.

In the foregoing and all subsequent equations herein, equal signs (=) do not necessarily indicate mathematical equivalence or identify, but are used for purposes of this disclosure merely as a convenient symbolic convention.

Let 68 be represented by the variable Y.

$Y=(y_1,y_2)$ where $y_1=6$ and $y_2=8$

Since $X+Y=117$, standard vertical addition can be represented as:

$$(x_1+y_1)+(x_2+y_2)=117 \quad \text{(eq. 1)}$$

However, adding the digits of operand X, $x_1$ and $x_2$, results in:

$x_1+x_2=13$ and adding digits $y_1$ and $y_2$ results in: $y_1+y_2=14$.

$$(x_1+x_2)+(y_1+y_2)=13+14=27 \quad \text{(eq. 2)}$$

Equation 1 is obviously not equal to equation 2.

From equation 1, the digits of value 117 can be reduced to the following single digit:

$$1+1+7=9 \quad \text{(eq. 1a)}$$

From equation 2, value 27 can be reduced to:

$$2+7=9 \quad \text{(eq. 2a)}$$

Equations 1a and 2a result in equal, single digits.

A greater number of digits and/or larger digits in either the operands or the result require iterative adding operations eventually resulting in a single digit value. For example, the digits of 68,879, added to one another results in 38, the sum of the digits of which is 11, the sum of the digits of which is the single digit 2. Thus three additions of digits are required to reduce 68,879 to an ultimate one digit value.

The foregoing principle suggests that the result obtained from vertical addition, if digits of the result are added to one another to reduce to a single digit (as in equation 1a) equals the result obtained from a horizontal addition of the digits of each operand reduced to a single digit (equation 2a).

The system has also proved successful for addition of two operands having a different number of digits (e.g., a 2-digit number added to a 4-digit number). Moreover, the system is applicable to multiplication, as shown below.

Let X=32 and Y=42.

```
  32
 ×42
 1344
```

-continued $$1344 = 1 + 3 + 4 + 4 = 12 = 1 + 2 = 3 \quad \text{(eq. 3)}$$

Horizontally, $32 = 3 + 2 = 5$, and $42 = 4 + 2 = 6$ (eq. 4)

$5 \times 6 = 30 = 3 + 0 = 3$

Equation 3 = Equation 4

This mathematical principle can be extended to subtraction and division.

For example, 38 divided by 13 results in:

$$38/13 = 2 \text{ remainder } 12 \quad \text{(eq. 5)}$$

$2 + (12) = 2 + (1 + 2) = 5$

The digits of the dividend reduce as follows:

$38=3+8=11$

The digits of the divisor reduce as follows:

$$13 = 1 + 3 = 4 \quad \text{(eq. 6)}$$

$11/4 = 2$ remainder 3

$2 + 3 = 5$

Equation 5 = Equation 6

In logical circuits such as are found in ALU's, the operation most frequently performed is addition, although other functions are, of course, frequently performed. The aforementioned mathematical principles and methodology can be used to create a procedure to detect errors that occur within an ALU (for example, when two or more numbers are added or otherwise arithmetically manipulated). Further, this principle can be used to correct erroneous results without re-adding vertically. This is significant because the cause of the incorrect vertical addition in the ALU could continue to generate the same or other erroneous results if the ALU is merely exercised in the same manner.

Error detection can be implemented to signal malfunctions or inaccurate arithmetic manipulation results when equation 1a does not equal equation 2a, equation 3 does not equal equation 4 or equation 5 does not equal equation 6. In the event that equation 1a is not equal to equation 2a (i.e., the reduced vertical single digit sum is not equal to the reduced horizontal single digit sum), a comparator will raise a status flag indicating the anomaly.

Consider the foregoing original example where two numbers 49 and 68 were added to one another. The sum of 49 and $68=49+68=117$. Suppose the result generated by a malfunctioning ALU is a number other than 117; say, for example, 100.

```
   49
  +68
  100(??)
```

$(x_1 + y_1) + (x_2 + y_2) = 100(??)$

In accordance with the present invention, the horizontal addition and reduction of each operand is performed as follows:

$$(x_1+x_2)+(y_1+y_2)=4+9+8+6=27 \quad \text{(eq. 7)}$$

Subtracting the digits from one another results in:

$$x_1 - x_2 = 4 - 9 = -5$$

$$y_1 - y_2 = 6 - 8 = -2$$

Adding the results:

$$(x_1 - x_2) + (y_1 - y_2) = -7 \quad \text{(eq. 8)}$$

Equation 7 − equation 8 results in:

$$2x_2 + 2y_2 = 18 + 16 = 34$$

$$x_2 + y_2 = 17 \quad \text{(eq. 9)}$$

Equation 7 + equation 8 results in:

$$2x_1 + 2y_1 = 8 + 12 = 20$$

$$x_1 + y_1 = 10 \quad \text{(eq. 10)}$$

For base 10 additions, the results of equations 9 and 10 respectively are:

carry$_1$(C$_1$) and (x$_2$+y$_2$) (i.e., 7 with 1 carry)

carry$_2$(C$_2$) and (x$_1$+y$_1$) (i.e., 0 with 1 carry)

Thus, $(x_1+y_1)+(x_2+y_2)$ can be represented in tabular form as:

| C$_2$ | x$_1$ + y$_1$ | C$_1$ | x$_2$ + y$_2$ |
|---|---|---|---|
| 1 | 0 | 1 | 7 |

By shifting the carry location (C$_1$) to the left, the tabular result is:

| C$_2$ | x$_1$ + y$_1$ | C$_1$ | x$_2$ + y$_2$ |
|---|---|---|---|
| 1 | 1 | 0 | 7 |

Eliminating zero values in carry columns (C$_1$) results in 117, which is the correct result.

The erroneous result (100) can now be replaced with the true answer (117), without performing the same vertical, conventional addition again that resulted in the original error.

As another example, consider two 3-digit numbers to be added to one another.

| 418 | X = (x$_1$,x$_2$,x$_3$) |
|---|---|
| +856 | Y = (y$_1$,y$_2$,y$_3$) |
| 1274 | X + Y |

Assume an ALU arrived at the erroneous result:

$$X + Y = 1018(??)$$

Horizontal summation of the digits of both operand yields:

$$x_1 + x_2 + x_3 + y_1 + y_2 + y_3 = 4 + 1 + 8 + 8 + 5 + 6 = 32 \quad \text{(eq. 11)}$$

Selective subtraction of one corresponding digit in each operand yields:

$$(x_1 + x_2 - x_3) + (y_1 + y_2 - y_3) = (-3) + (7) = 4 \quad \text{(eq. 12a)}$$

$$(x_1 - x_2 + x_3) + (y_1 - y_2 + y_3) = (11) + (9) = 20 \quad \text{(eq. 12b)}$$

$$(-x_1 + x_2 + x_3) + (-y_1 + y_2 + y_3) = (5) + (3) = 8 \quad \text{(eq. 12c)}$$

Equations are subtracted from one another to arrive at column values for the carry table:

Eq. 11 − eq. 12a = $2x_3 + 2y_3 = 28$ (eq. 13a)

$$x_3 + y_3 = 14$$

Eq. 11 − eq. 12b = $2x_2 + 2y_2 = 12$ (eq. 13b)

$$x_2 + y_2 = 6$$

Eq. 11 − eq. 12c = $2x_1 + 2y_1 = 24$ (eq. 13c)

$$x_1 + y_1 = 12$$

The tabular form of the sum of each corresponding digit in the two operands is as follows:

| C$_1$ | x$_1$ + y$_1$ | C$_2$ | x$_2$y$_2$ | C$_3$ | x$_3$ + y$_3$ |
|---|---|---|---|---|---|
| 1 | 2 | 0 | 6 | 1 | 4 |

Left shifting the carry locations (C$_2$ and C$_3$) yields the following result:

| C$_1$ | x$_1$ + y$_1$ | C$_2$ | x$_2$ + y$_2$ | C$_3$ | x$_3$ + y$_3$ |
|---|---|---|---|---|---|
| 1 | 2 | 0 | 7 | 0 | 4 |

Eliminating zero values in carry columns (C$_2$ and C$_3$) results in 1274, which is the correct result.

Figure 2:
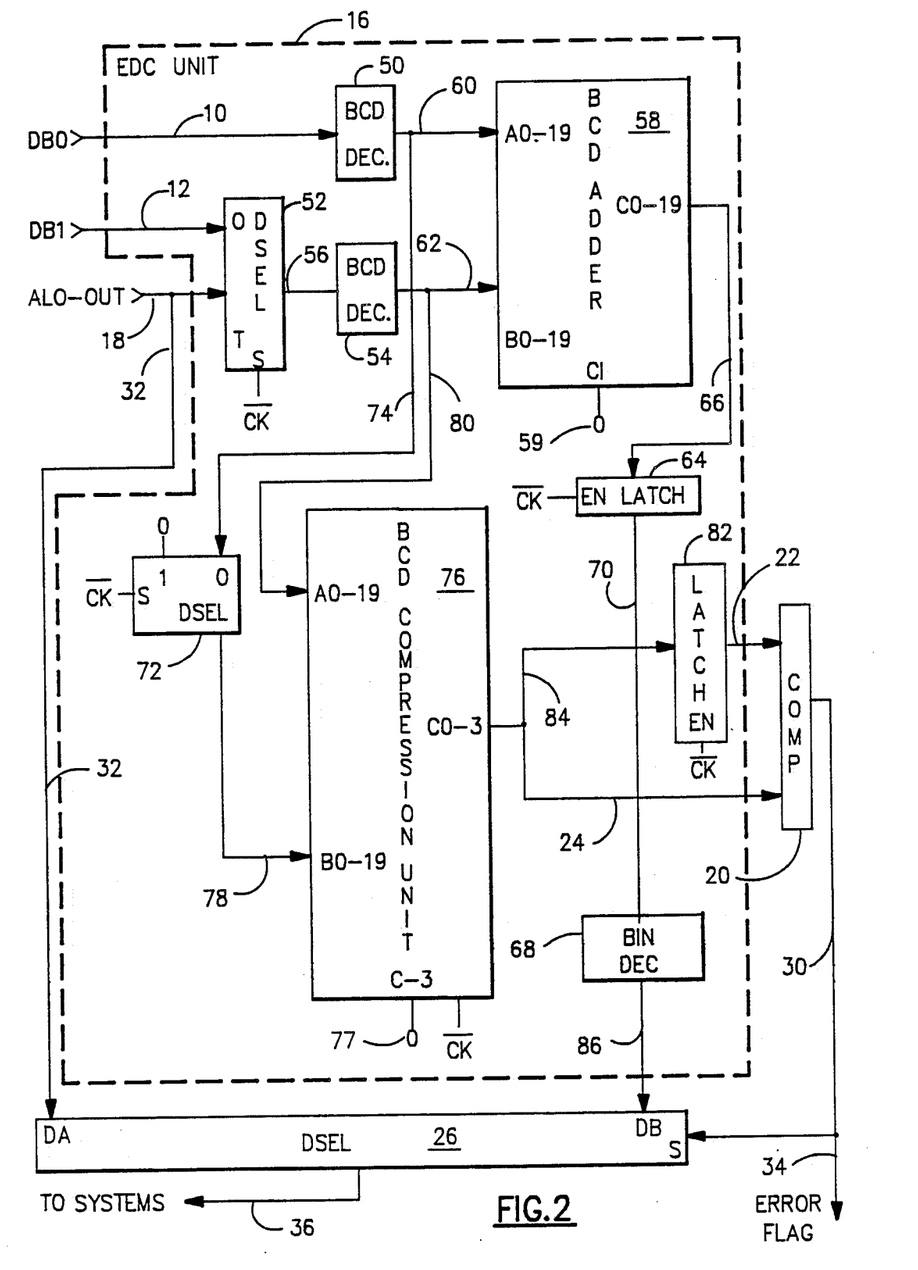
FIG. 2 is a block diagram of the error detection and correction units shown in FIG. 1.

Referring now again to the method and apparatus of the present invention, FIG. 2 shows a block diagram of the error detection and correction unit 16 (FIG. 1).

Data line 10 applies DB0 signal to a binary to binary coded decimal (BCD) decoder 50, which accepts a 16-bit signal and converts the binary code therein to BCD values. The BCD decoder 50 operates as a look-up table and can be fabricated, as is well known in the art, from any programmable device suitable for this purpose.

Data signal DB1 over line 12, carrying a binary value representative of the second operand, is input to a data selector device 52 which also accepts a signal from line 18, which signal is representative of the output of ALU 14 (FIG. 1). The data selector 52 is a multiplexer which selects one input signal 12 or the other input signal 18 and applies it to another binary to binary coded decimal decoder 54 over 16-bit data line 56.

The output signals of BCD decoders 50 and 54 are applied to a BCD adder 58 over 20-bit data lines 60 and 62, respectively. BCD adder 58 is described in greater detail hereinbelow. Output lines 60 and 62 are 20-bit lines whereas input lines 10, 12 and 18 are 16-bit lines because 16 bits of binary information require 20 bits when represented in BCD format. BCD adder 58 has provision for inputting a carry-in value 59, but this is preset and always fixed at level zero for purposes of the present invention.

The output signal of BCD adder 58 is applied to a 20-bit latch 64 over data line 66. The output signal of latch 64 is applied to a DCD to binary decoder 68 over data line 70.

The output signal of BCD decoder 50 is applied not only to BCD adder 58, as mentioned, but also to a data selector 72 over line 74. The output signal of data selector 72 is applied to a BCD compression unit 76, described in greater detail hereinbelow, over a 20-bit data line 78. Also applied to BCD compression unit 76 over a 20-bit data line 80 is the output signal of BCD decoder 54. BCD compression unit 76 has provision for inputting a carry-in value 77, but this is preset and always fixed at level zero for purposes of the present invention.

BCD compression unit 76 generates a signal which is applied to a latch 82 over 4-bit data line 84. The output signal of latch 82, as well as the direct output signal from BCD compression unit 76, is applied to comparator 20 over 4-bit data lines 22 and 24, respectively. As mentioned above, the output signal of comparator 20 is applied to data selector 26. The output signal of binary decoder 68 is also applied to data selector 26 over 16-bit data line 86.

Figure 3:
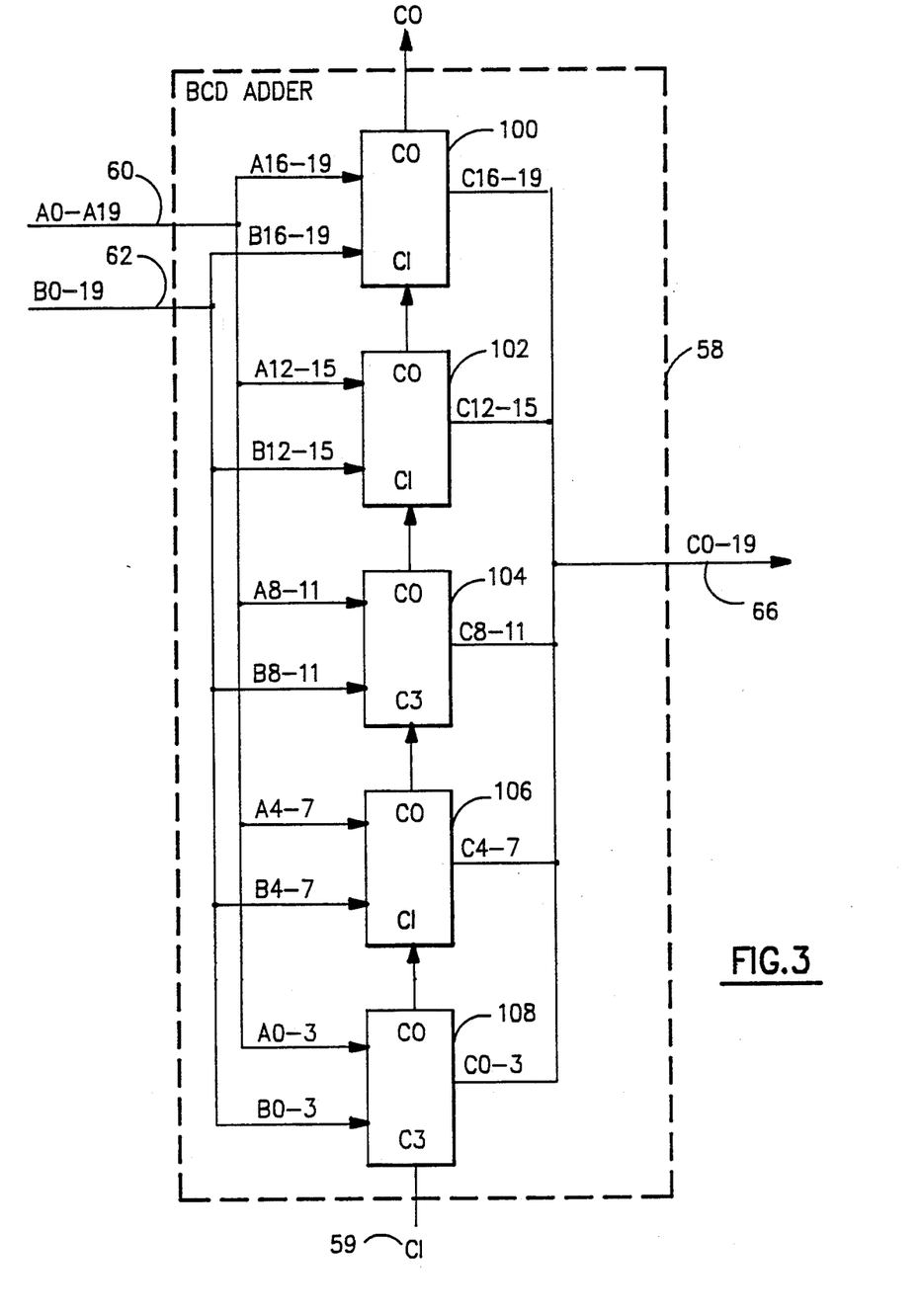
FIG. 3 is a block diagram of the BCD adder shown in FIG. 2.

Referring now also to FIG. 3, there is shown a block diagram of the BCD adder 58, shown in FIG. 2. The input lines to the BCD adder 58 are shown as reference numerals 60 and 62. Each of these lines 60 and 62 is a 20-bit data line. The BCD adder 58, therefore, is a 20-bit BCD adder, the output signal of which is generated over data line 66.

The 20-bit BCD adder 58 comprises five 4-bit BCD adder units 100, 102, 104, 106, 108. The 4-bit units 100-108 are connected to one another by suitable means known in the art and shown in FIG. 3. They are connected to input lines 60 and 62 and to output data line 66.

Figure 4:
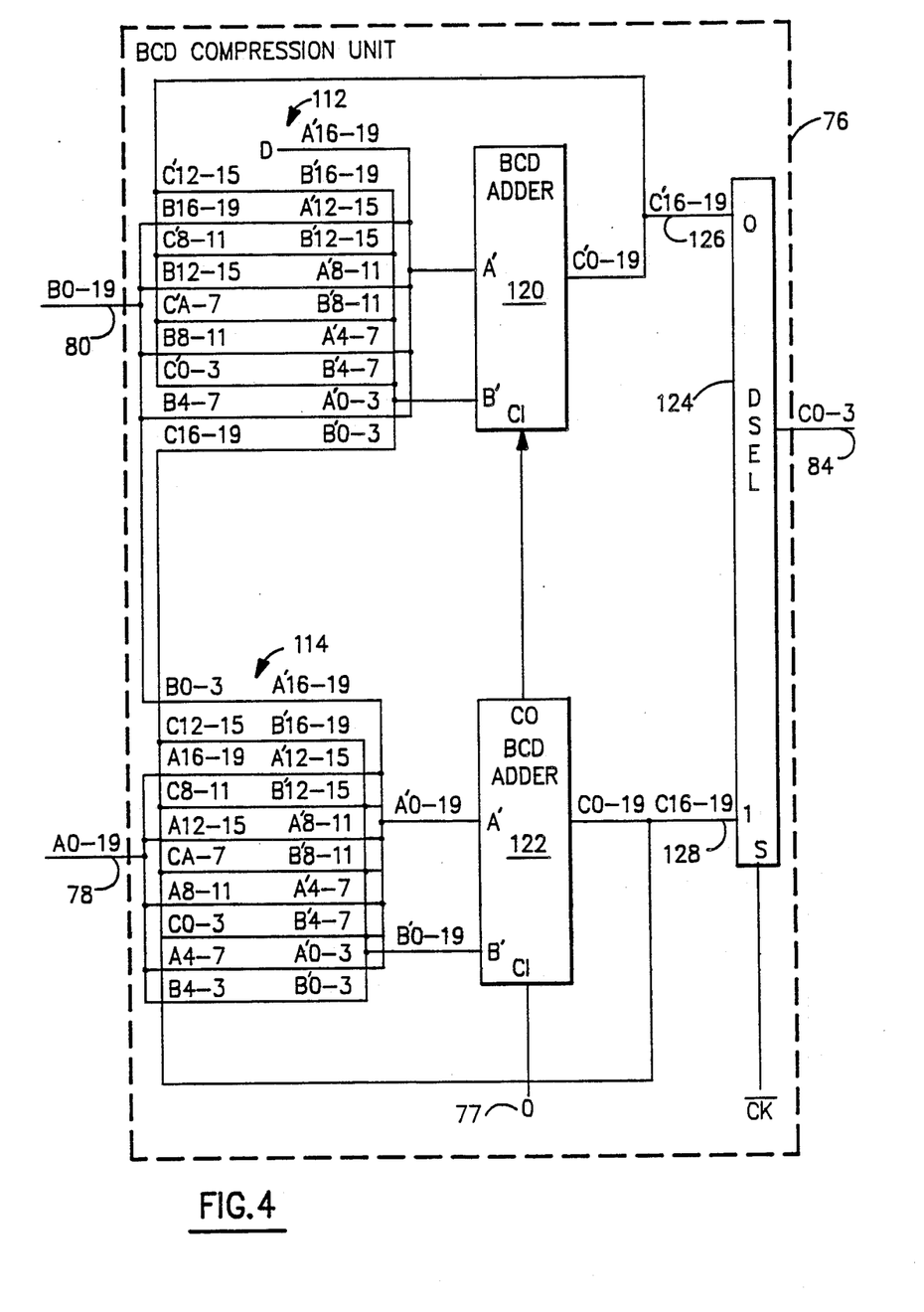
FIG. 4 is a block diagram of the BCD compression unit shown in FIG. 2.

Referring now also to FIG. 4 there is shown a block diagram of the BCD compression unit 76 (FIG. 2). Binary coded decimal compression unit 76 performs horizontal additions of the digits in each of the operands, in accordance with the mathematical principles as hereinabove described.

The 20-bit data lines 78 and 80 are input into compression unit 76 and are applied over two networks of signal lines, shown generally as reference numerals 112 and 114 to 20-bit BCD adders 120 and 122. BCD compression unit 76 comprises two BCD adders 120 and 122 that are identical to the BCD adder 58 shown in FIG. 2. The difference of operation is based solely on the configuration of the BCD adders 120 and 122 and their associated networks 112 and 114.

Moreover, the output signal from each of the BCD adders 120 and 122 is fed back to the data line networks 112 and 114. This operation results in output signals C'0-C'19 and C0-C19 of the BCD adders 120 and 122 respectively, that are representative of a compressed 4-bit output. The compressed signal is applied to data selector 124 over the pair of 4-bit data lines 126 and 128. The output signal of data selector 124 is eventually applied to comparator 20 (FIG. 2) over 4-bit data line 84.

Figure 5:
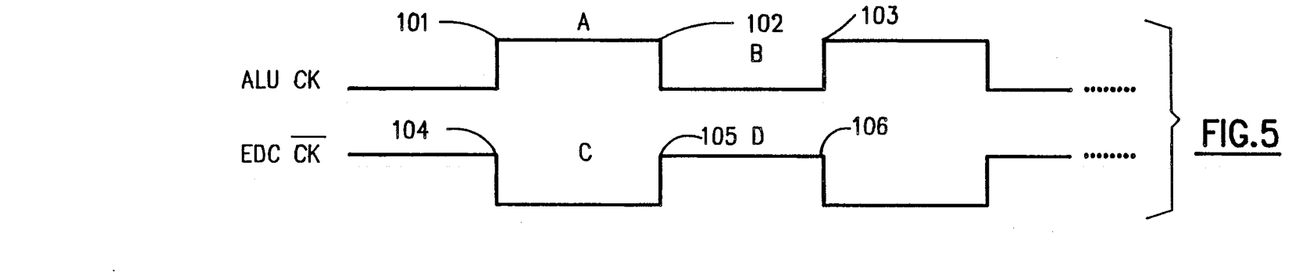
FIG. 5 is a timing diagram depicting system operation.

Referring now also to FIG. 5 there is shown a timing diagram in which a clock signal CK has a leading edge shown at reference numeral 101 which occurs when ALU 14 (FIG. 1) begins arithmetic operations. The ALU 14 initiates operation on the operands by means of signal lines 10 and 12. During the first half of the CK signal cycle, designated as letter A in the FIGURE, ALU 14 computes the addition of the operands or performs some other arithmetic manipulation. At this time, BCD adder 58 within EDC unit 16 also begins arithmetic operations. Also, BCD compression unit 76 performs a compression operation to arrive at a 4-bit compressed value representative of the horizontal sum of both of the operands.

At point 102, ALU 14 generates an output signal that provides the result of its operation. The output signal is generated on data lines 18 and 32. During time period B, ALU 14 continues to generate a resultant signal output on data lines 18 and 32.

At point 103 in the cycle, the next ALU operation on operands is initiated.

Shown in the timing diagram of FIG. 5 is a $\overline{CK}$ signal which is an antiphasal complement of the clock CK cycle. Thus, ALU 14 operates on the basis of the CK cycle whereas EDC subsystem operates on the basis of the $\overline{CK}$ clock cycle. At the end of the positive half of the $\overline{CK}$ signal, the result of the arithmetic operations that occur in ALU 14 are available over data lines 32 and 18 (FIG. 1).

At point 104, the $\overline{CK}$ signal cycle is initiated. Point 104 occurs at the same time as point 101. The signal representative of the value of an operand on data line 10 is input to BCD decoder 50. At the same time, the operand represented by a signal on data line 12 is enabled onto signal line 56 by means of data selector 52, port 0.

During time period C, the BCD equivalent of the operand on signal line 10 drives signal lines 60 and 74, providing inputs to BCD adder 58, port A, and data selector 72, port 0. The output signal of data selector 72 drives signal line 78 and is input to BCD compression unit 76, port B. The BCD equivalent of the operand value that is transmitted on data line 56 drives data lines 62 and 80, providing input to BCD adder 58, port B, and BCD compression unit 76, port A.

BCD adder 58 computes the BCD addition of the operands on data line 60 and 62. The output signal of BCD adder 58 is transmitted on data line 66, whic is then input to latch 64, the latch 64 being in a transparent mode. BCD compression unit 76 performs the horizontal BCD addition or other arithmetic manipulation of the two operands on data lines 80 and 78. The BCD compression unit 76 generates a signal representative of the foregoing arithmetic manipulation over 4-bit data line 84, which is applied to latch 82 in a transparent mode.

At point 105 in the $\overline{CK}$ clock cycle, the value representative of the operand on data line 66 is latched by latch 64 as output to data line 70 and input to binary decoder 68. The value representative of the operand on data line 84 is latched by latch 82, applied to data line 22 and input to comparator 20. ALU 14 generates an output signal over data line 18, which is enabled onto data line 56 by means of data selector 52, port 1. A zero operand is enabled onto data line 78 by means of data selector 72, port 1.

During time period D, the BCD equivalent of the value representative of the operand on data line 56 drives data line 80, providing an input to BCD compression unit 76, port A. A zero operand is input to BCD compression unit 76, port B.

BCD compression unit 76 performs the horizontal BCD addition or other arithmetic operation of the operands on data lines 80 and 78 generates the 4-bit result representative of a single digit on data line 24, which is the second input to comparator 20. Binary decoder 58 converts the BCD value representative of the operand on data line 70 to its binary equivalent and generates a result on data line 86, the second input to data selector 26.

Also during this time interval D, comparator 20 generates a 1-bit status signal onto data lines 30 and 34. This status signal represents the result of the comparison of the operands on data lines 22 and 24. The status signal 30 is input to data selector 26, which passes one of the operands on data lines 32 and 86 to its output data line 36.

At point 106, the next operation for EDC 16 is initiated. The operand on data line 36 and error flag 34 are latched into the microprocessor system, not shown.

It can be seen that BCD compression unit 76 operates twice within one clock cycle, the first time to perform a horizontal adding and compression and the second time to perform the compression for the output of ALU 14. The resultant signals that are applied to data lines 22 and 24, therefore, represent the compressed value of the horizontal and the compressed value of the ALU output signals respectively. Comparator 20 performs a comparison of these two compressed signals during the latter half of the positive half cycle of the CK signal.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for detecting and correcting an error in a result of an arithmetic operation, said arithmetic operation involving at least two operands, each of said at least two operands comprising at least one element; the system comprising:

a first arithmetic operation means for performing said arithmetic operation, said first arithmetic operation means receiving said at least two operands as at least one input and generating a first output, said first output having at least one first digit being representative of said results;

a second arithmetic operation means for performing said arithmetic operation, said second arithmetic operation means receiving said at least one input and generating a second output, said second output being representative of said result;

an error detection means for detecting an error by said first arithmetic operation means, said error detection means generating an error indicating signal when said error is detected; and a data selector means for effecting selection of said first output or said second output; said selection being responsive to said error indicating signal, said data selector means providing a system output; said system output comprising either said first output or said second output according to said selection;

said error detection means performing the steps of:

(a) receiving said at least one input and performing check-adding of each of said at least one element of each of said at least two operands to calculate an intermediate sum for each of said at least two operands;

(b) reiteratively performing step (a) appropriately to calculate a single-digit intermediate sum for each of said at least two operands;

(c) performing said arithmetic operation using said single-digit intermediate sum for each of said at least two operands to produce an interim result, said interim result comprising at least one interim digit;

(d) adding each of said at least one interim digit to calculate an iterative interim result;

(e) repeating step (d) until a single-digit iterative interim result is calculated;

(f) receiving said first output;

(g) adding each of said at least one first digit to calculate an interim first result comprising at least one first interim digit;

(h) adding each of said at least one first interim digit to calculate a first iterative interim result;

(i) repeating step (h) until a single-digit first iterative interim result is calculated;

said error detection means generating said error indicating signal when said single-digit iterative interim result and said single-digit first iterative interim result are different.

2. A system for detecting and correcting an error in a result of an arithmetic operation as recited in claim 1 wherein said first arithmetic operation means treats said at least two operands in a first format, and said second arithmetic operation means treats said at least two operands in a second format.

3. A system for detecting and correcting an error in a resulting of an arithmetic operation as recited in claim 2 wherein said first format comprises a binary format.

4. A system for detecting and correcting an error in a result of an arithmetic operation as recited in claim 3 wherein said second format comprises a binary coded decimal format.

5. A system for detecting and correcting an error in a result of an arithmetic operation as recited in claim 2 wherein said error detection means treats said at least two operands in said second format.

6. A system for detecting and correcting an error in a result of an arithmetic operation as recited in claim 2 wherein said system output is said second output when said error indicating signal is received by said data selector means.

7. A system for detecting and correcting an error in a result of an arithmetic operation as recited in claim 6 wherein said arithmetic operation is addition.

8. A system for detecting and correcting an error in a result of an arithmetic operation as recited in claim 6 wherein said arithmetic operation is subtraction.

9. A system for detecting and correcting an error in a result of an arithmetic operation as recited in claim 6 wherein said arithmetic operation is multiplication.

10. A system for detecting and correcting an error in a result of an arithmetic operation as recited in claim 1 wherein said system output is said second output when said error indicating signal is received by said data selector means.

11. A system for detecting and correcting an error in a result of an arithmetic operation as recited in claim 1 wherein said arithmetic operation is addition.

12. A system for detecting and correcting an error in a result of an arithmetic operation as recited in claim 1 wherein said arithmetic operation is subtraction.

13. A system for detecting and correcting an error in a result of an arithmetic operation as recited in claim 1 wherein said arithmetic operation is multiplication.

* * * * *